United States Patent
Um (10) Patent No.: US 9,207,380 B2
(45) Date of Patent: Dec. 8, 2015

(54) DISPLAY DEVICE

(75) Inventor: Kee Tae Um, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 438 days.

(21) Appl. No.: 13/809,382

(22) PCT Filed: Jul. 5, 2011

(86) PCT No.: PCT/KR2011/004900
§ 371 (c)(1),
(2), (4) Date: Jan. 9, 2013

(87) PCT Pub. No.: WO2012/005489
PCT Pub. Date: Jan. 12, 2012

(65) Prior Publication Data
US 2013/0114301 A1 May 9, 2013

(30) Foreign Application Priority Data

Jul. 9, 2010 (KR) ........................ 10-2010-0066102

(51) Int. Cl.
*F21V 8/00* (2006.01)
*F21V 13/02* (2006.01)

(52) U.S. Cl.
CPC .............. *G02B 6/0031* (2013.01); *F21V 13/02* (2013.01); *G02B 6/0023* (2013.01); *G02B 6/0025* (2013.01)

(58) Field of Classification Search
USPC ......................................... 362/608, 609, 610
See application file for complete search history.

(56) References Cited

U.S. PATENT DOCUMENTS

| 7,481,562 | B2 | 1/2009 | Chua et al. | |
|---|---|---|---|---|
| 2006/0072339 | A1* | 4/2006 | Li et al. | 362/608 |
| 2006/0119915 | A1 | 6/2006 | Sugiura et al. | |
| 2007/0057626 | A1 | 3/2007 | Kurihara et al. | |
| 2007/0081329 | A1 | 4/2007 | Chua et al. | |
| 2007/0257597 | A1 | 11/2007 | Sakata et al. | |
| 2008/0084706 | A1 | 4/2008 | Roshan et al. | |
| 2009/0135334 | A1 | 5/2009 | Akiyama et al. | |
| 2010/0157406 | A1 | 6/2010 | Gruhlke et al. | |
| 2011/0012147 | A1* | 1/2011 | Bierhuizen et al. | 257/98 |
| 2011/0141769 | A1* | 6/2011 | Lee et al. | 362/629 |
| 2012/0257414 | A1* | 10/2012 | Park et al. | 362/611 |
| 2013/0114242 | A1* | 5/2013 | Pickard et al. | 362/84 |

FOREIGN PATENT DOCUMENTS

| JP | 2004-281394 A | 10/2004 |
|---|---|---|
| JP | 2006-84584 A | 3/2006 |
| JP | 2006-162910 A | 6/2006 |
| JP | 2007-243135 A | 9/2007 |
| JP | 2008-112154 A | 5/2008 |
| JP | 2009-110932 A | 5/2009 |

(Continued)

OTHER PUBLICATIONS

Korean Notice of Allowance dated Nov. 10, 2011, issued in KR 10-2010-0066102.

*Primary Examiner* — Laura Tso
(74) *Attorney, Agent, or Firm* — Birch, Stewart, Kolasch & Birch, LLP (57) ABSTRACT

Provided is a display device. The display device includes a light guide plate, a light source disposed on a side surface of the light guide plate, a light conversion member disposed between the light source and the light guide plate, and a plurality of light path change particles disposed between the light conversion member and the light guide plate.

18 Claims, 6 Drawing Sheets

(56) References Cited

FOREIGN PATENT DOCUMENTS

| | | | |
|---|---|---|---|
| KR | 100845869 B | 7/2008 | |
| KR | 10-2009-0021912 A | 3/2009 | |
| TW | I298955 B | 7/2008 | |
| TW | I323817 B | 4/2010 | |

* cited by examiner

DISPLAY DEVICE

TECHNICAL FIELD

Embodiments relate to a display device.

BACKGROUND ART

Light emitting diodes (LEDs) are semiconductor devices that convert electricity into ultraviolet rays, infrared rays, or visible light using characteristics of compound semiconductors. The LEDs are being used for home appliances, remote controllers, large-scale screen, etc.

LED light sources having high brightness are being used for lighting lamps. In addition, since such an LED light source has high energy efficiency, low replacement cost due to a long life cycle, and durability against vibration or shock and does not use toxic substances such as mercury, existing incandescent lamps or fluorescent lamps are being replaced with LED light sources of energy-saving, environmental protection and reducing costs.

Also, LEDs are favorable for light sources of middle or large sized LCD televisions and monitors. The LEDs have superior color purity and low power consumption and allow easy miniaturization when compared to cold cathode fluorescent lamps (CCFLs) mainly used for light sources of the current liquid crystal displays (LCDs). Thus, the prototypes of these LEDs are being mass-produced, and also, researches with respect to the LEDs are being more actively conducted.

In recent, various technologies, which use a blue LED and realize white light using a quantum dot (QD) emitting red light and green light as a phosphor are being developed. This is done because the white light realized using the quantum dot has high brightness and superior color reproductivity.

Nevertheless, the need of researches for reducing light losses, which may occur in case where the LED is applied to LED backlight units, and improving color uniformity is on the rise as ever.

DISCLOSURE OF INVENTION

Technical Problem

Embodiments provide a display device having improved brightness and color reproductivity. Specifically, embodiments provide a display device which prevents yellowing phenomenon from occurring without realizing uniform white light.

Solution to Problem

In one embodiment, a display device includes: a light guide plate; a light source disposed on a side surface of the light guide plate; a light conversion member disposed between the light source and the light guide plate; and a plurality of light path change particles disposed between the light conversion member and the light guide plate.

In another embodiment, a display device includes: a light source generating first light; a light conversion member through which a portion of the first light is transmitted and the other portion of the first light is converted into second and third light; and a plurality of light path change particles for selectively reflecting the first light.

In further another embodiment, a display device includes: a light guide plate; a light source disposed on a side surface of the light guide plate; a light conversion member disposed between the light source and the light guide plate; an adhesion member adhering to the light guide plate and the light conversion member; and a plurality of light path change particles dispersed into the adhesion member, wherein each of the light path change particles comprises a reflection part selectively reflecting light having a wavelength band of about 400 nm to about 500 nm.

The details of one or more embodiments are set forth in the accompanying drawings and the description below. Other features will be apparent from the description and drawings, and from the claims.

Advantageous Effects of Invention

In the display device according to the embodiments, the light path change particles may be disposed between the light conversion member and the light guide plate to allow divergence angles of the first, second, and third light to be uniform as a whole.

Specifically, the light path change particles may selectively reflect the first light having a relatively small divergence angle. Thus, the light path change particles may increase the divergence angle of the first light. Therefore, the display device according to the embodiments may have improved brightness and color reproductivity.

That is, in the display device according to the embodiments, the first, second, and third light may be uniformly mixed with each other to realize uniform white light.

MODE FOR THE INVENTION

In the descriptions of embodiments, it will be understood that when a substrate, a frame, a sheet, a layer, or a pattern is referred to as being 'on' a substrate, a substrate, a frame, a sheet, a layer, or a pattern, it can be directly on another layer or substrate, or intervening layers may also be present. Further, it will be understood that when a layer is referred to as being 'under' another layer, it can be directly under another layer, and one or more intervening layers may also be present. Further, the reference about 'on' and 'under' each layer will be made on the basis of drawings. In the drawings, the thickness or size of each layer is exaggerated, omitted, or schematically illustrated for convenience in description and clarity. Also, the size of each element does not entirely reflect an actual size.

Figure 1:
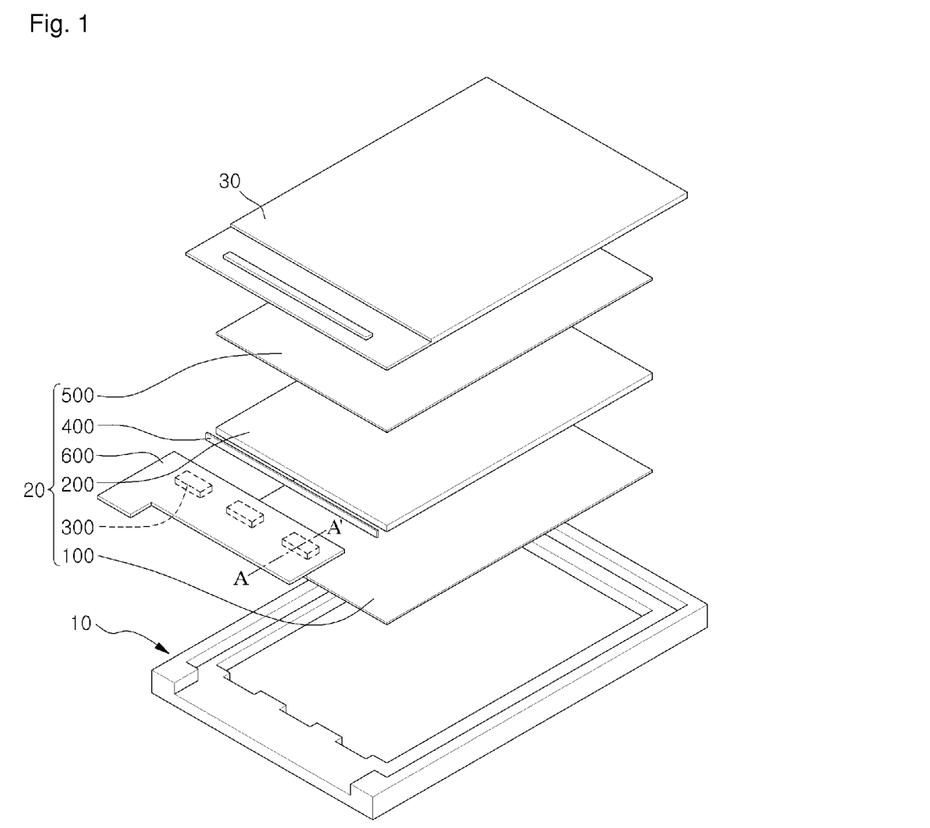
FIG. 1 is an exploded perspective view of a liquid crystal display according to a first embodiment.
Figure 2:
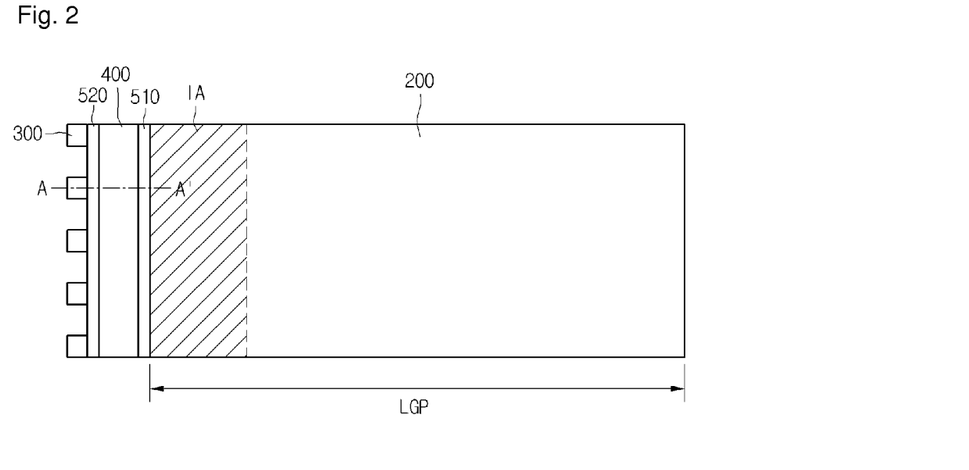
FIG. 2 is a plan view of a backlight assembly.
Figure 3:
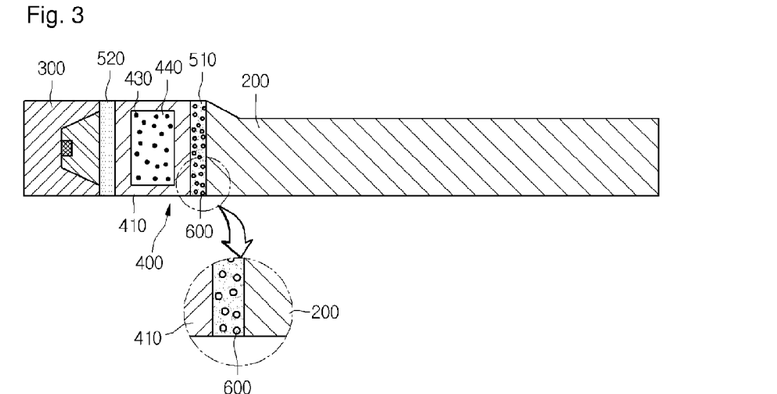
FIG. 3 is a sectional view taken along line A-A of FIG. 2.
Figure 4:
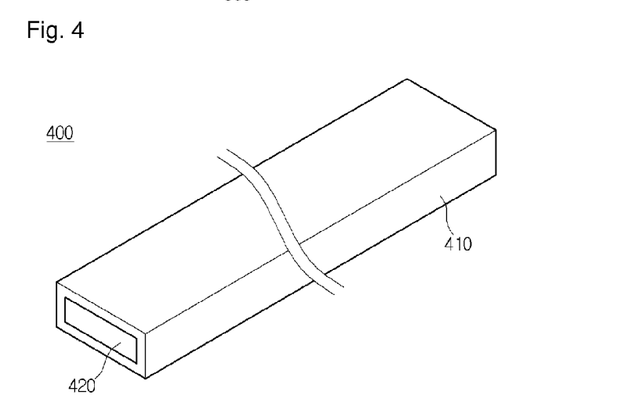
FIG. 4 is a perspective view of a light conversion member.
Figure 5:
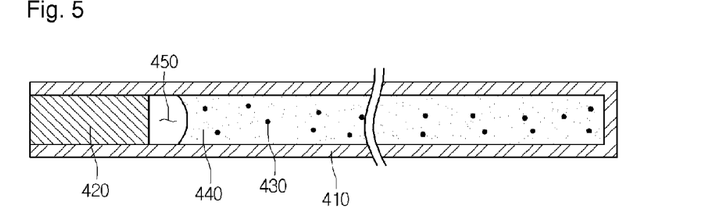
FIG. 5 is a sectional view illustrating one surface of the light conversion member.
Figure 6:
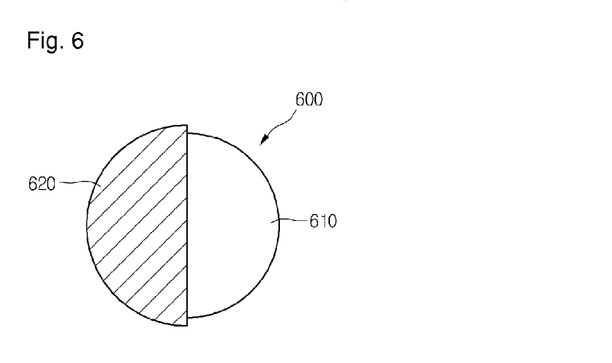
FIG. 6 is a view of a light path change particle.
Figure 7:
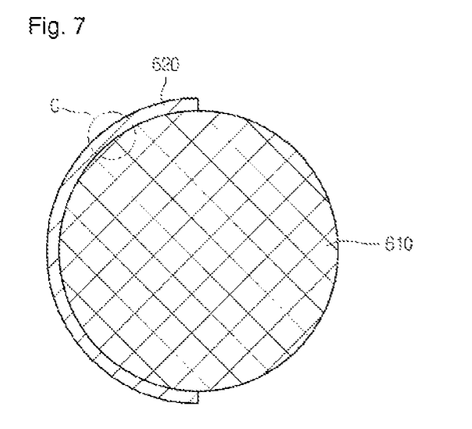
FIG. 7 is a sectional view illustrating one surface of the light path change particle.
Figure 8:
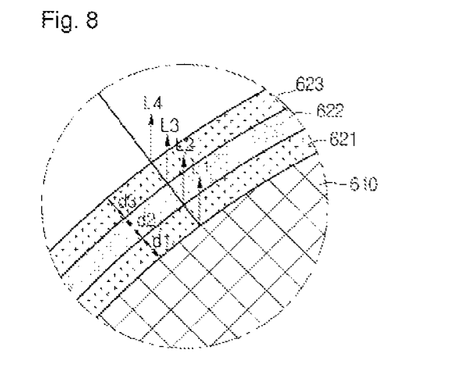
FIG. 8 is a sectional view of a reflection part.
Figure 9:
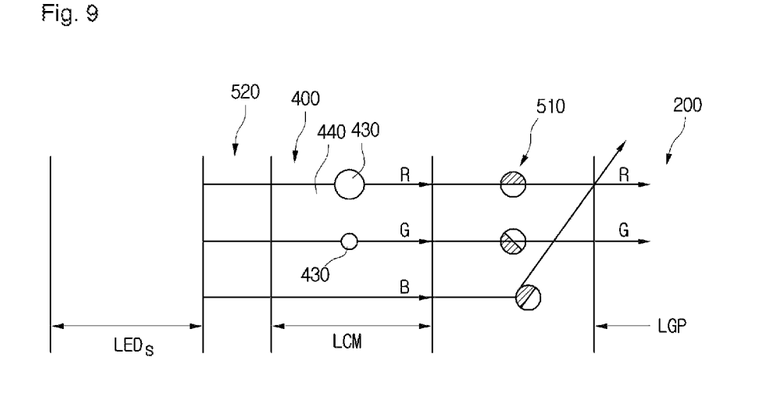
FIG. 9 is a view illustrating a process of displaying an image on a liquid crystal display according to the first embodiment.

FIG. 1 is an exploded perspective view of a liquid crystal display according to a first embodiment. FIG. 2 is a plan view of a backlight assembly. FIG. 3 is a sectional view taken along line A-A of FIG. 2. FIG. 4 is a perspective view of a light conversion member. FIG. 5 is a sectional view illustrating one surface of the light conversion member. FIG. 6 is a view of a light path change particle. FIG. 7 is a sectional view illustrating one surface of the light path change particle. FIG. 8 is a sectional view of a reflection part. FIG. 9 is a view illustrating a process of displaying an image on a liquid crystal display according to the first embodiment.

Referring to FIGS. 1 to 9, a liquid crystal display according to an embodiment includes a mold frame 10, a backlight assembly 20, and a liquid crystal panel 30.

The mold frame 10 receives the backlight assembly 20 and the liquid crystal panel 30. The mold frame 10 has a square frame shape. For example, the mold frame 10 may be formed of plastic or reinforcement plastic.

Also, a chassis surrounding the mold frame 10 and supporting the backlight assembly 20 may be disposed under the mold frame 10. The chassis may be disposed on a side surface of the mold frame 10.

The backlight assembly 20 is disposed inside the mold frame 10 to generate light, thereby emitting the generated light toward the liquid crystal panel 30. The backlight assembly 20 includes a reflective sheet 100, a light guide plate (LGP) 200, a light emitting diode (LED) 300, a light conversion member (LCM) 400, a first adhesion member 510, a second adhesion member 520, a plurality of light path change particles 600, a plurality of optical sheets 700, and a flexible printed circuit board (FPCB) 800.

The reflective sheet 100 reflects light emitted from the LED 300 upward.

The light guide plate 200 is disposed on the reflective sheet 100. The light guide plate 200 receives the light emitted from the LED 300 to reflect the light upward through reflection, refraction, and dispersion.

The light guide plate 200 has a light incident surface facing the LED 300. That is, a surface facing the LED 300 of side surfaces of the light guide plate 200 is the light incident surface.

The LED 300 is disposed on a side surface of the light guide plate 200. In detail, the LED 300 is disposed on the light incident surface.

Referring to FIG. 3, the LED 300 may include a body part 310, an LED chip 320, a lead electrode (not shown), and a filler 340.

A cavity is defined in the body part 310. The cavity may receive the LED chip 320 and the filler 340. The body part 310 may be formed of plastic. A reflective layer (not shown) for reflecting light emitted from the LED chip 320 may be coated on an inner surface of the cavity.

The LED chip 320 is disposed inside the cavity. The LED chip 320 receives an electrical signal through the lead electrode to generate light. The LED chip 320 is electrically connected to the lead electrode.

The filler 340 surrounds the LED chip 320. The filler 340 may be filled into the inside of the cavity. The filler 340 is transparent. An exposed outer surface of the filler 340 is a light emission surface through which light is emitted. The light emission surface may be a flat or curved surface.

The lead electrode is connected to the LED chip 320. Also, the lead electrode is electrically connected to the FPCB 800.

The lead electrode and the body part 310 may be manufactured through an injection molding process.

The LED 300 is a light source for generating light. In detail, the LED 300 emits light toward the light conversion member 400.

The LED 300 may be a blue LED generating blue light or an UV LED generating UV rays. That is, the LED 300 may generate the light having a wavelength band of about 430 nm to about 470 nm or an ultraviolet ray having wavelength band of about 300 nm to about 40 nm.

The LED 300 is mounted on the FPCB 800. The LED 300 is disposed under the FPCB 800. The LED 300 receives a driving signal through the FPCB 800, and then is driven.

The light conversion member 400 is disposed between the LED 300 and the light guide plate 200. The light conversion member 400 adheres to the side surface of the light guide plate 200. In detail, the light conversion member 400 is attached to the light incident surface of the light guide plate 200. Also, the light conversion member 400 may adhere to the LED 300.

The light conversion member 400 receives light emitted from the LED 300 to convert a wavelength of the light. For example, the light conversion member 400 may convert blue light emitted from the LED 300 into green light and red light. That is, the light conversion member 400 may convert a portion of the blue light into the green light having a wavelength band of about 500 nm to about 600 nm and the other portion of the blue light into the red light having a wavelength band of about 600 nm to about 700 nm.

Also, the light conversion member 400 may convert an ultraviolet ray emitted from the LED 300 into blue, green, and red light. That is, the light conversion member 400 may convert a portion of the ultraviolet ray into blue light having a wavelength band of about 400 nm to about 500 nm, another portion of the ultraviolet ray into green light having a wavelength band of about 500 nm to about 600 nm, and further another portion of the ultraviolet ray into red light having a wavelength band of about 600 nm to about 700 nm.

Thus, the light transmitting the light conversion member 400 and the light converted by the light conversion member 400 may generate white light. That is, the blue light, the green light, and the red light may be combined with each other to generate the white light, and then, the generated white light may be incident into the light guide plate 200.

Referring to FIGS. 3 to 5, the light conversion member 400 includes a tube 410, a sealing member 420, a plurality of light conversion particles 430, and a host 440. Also, the light conversion member 400 may further include a disperser.

The tube 410 receives the sealing member 420, the light conversion particles 430, and the host 440. That is, the tube 410 may be a container for receiving the sealing member 420, the light conversion particles 430, and the host 440. Also, the tube 410 has a shape longitudinally extending in one direction.

The tube 410 may have a square tube shape. That is, the tube 410 may have a rectangular shape in a section of a direction perpendicular to a length direction thereof. Also, the tube 410 may have a height of about 0.6 mm and a thickness of about 0.2 mm. That is, the tube 410 may be a capillary tube.

The tube 410 is transparent. For example, the tube 410 may be formed of glass. That is, the tube 410 may be a glass capillary tube.

The sealing member 420 is disposed inside the tube 410. The sealing member 420 is disposed on an end of the tube 410. The sealing member 420 seals the inside of the tube 410. The sealing member 420 may be formed of an epoxy resin.

The light conversion particles 430 are disposed inside the tube 410. In detail, the light conversion particles 430 are uniformly dispersed in the host 440, and the host 440 is disposed inside the tube 410.

The light conversion particles 430 convert a wavelength of light emitted from the LED 300. The light conversion particles 430 receive the light emitted from the LED 300 to convert the wavelength of the light. For example, the light conversion particles 430 may convert the blue light emitted from the LED 300 into green light and red light. That is, a portion of the light conversion particles 430 may convert the blue light into the green light having a wavelength band of about 500 nm to about 600 nm, and the other portion of the light conversion particles 430 may convert the blue light into the red light having a wavelength band of about 600 nm to about 700 nm.

On the other hand, the light conversion particles 430 may convert an ultraviolet ray emitted from the LED 300 into blue, green, and red light. That is, a portion of the light conversion particles 430 may convert the ultraviolet ray into blue light having a wavelength band of about 400 nm to about 500 nm, another portion of the light conversion particles 430 may convert the ultraviolet ray into green light having a wavelength band of about 500 nm to about 600 nm, and further another portion of the light conversion particles 430 may convert the ultraviolet ray into red light having a wavelength band of about 600 nm to about 700 nm.

That is, when the LED 300 is the blue LED emitting the blue light, the light conversion particles 430 for respectively converting the blue light into the green and red light may be used. On the other hand, when the LED 300 is the UV LED emitting the ultraviolet ray, the light conversion particles 430 for respectively converting the ultraviolet ray into the blue, green, and red light may be used.

The light conversion particles 430 may be a plurality of quantum dots QD. Each of the quantum dots may include a core nano crystal and a shell nano crystal surrounding the core nano crystal. Also, the quantum dot may include an organic ligand coupled to the shell nano crystal. Also, the quantum dot may include an organic coated layer surrounding to the shell nano crystal.

The shell nano crystal may have two-layered structure. The shell nano crystal is disposed on a surface of the core nano crystal. The quantum dot may convert a wavelength of light incident into the core nano crystal into light having a long wavelength through the shell nano crystal forming a shell layer to improve light efficiency.

The quantum dot may be formed of at least one material of a group II compound semiconductor, a group III compound semiconductor, a group V compound semiconductor, and a group VI compound semiconductor. In detail, the core nano crystal may be formed of Cdse, InGaP, CdTe, CdS, ZnSe, ZnTe, ZnS, HgTe, or HgS. Also, the shell nano crystal may be formed of CuZnS, CdSe, CdTe, CdS, ZnSe, ZnTe, ZnS, HgTe, or HgS. Each of the quantum dots may have a diameter of about 1 nm to about 10 nm.

The wavelength of the light emitted from the quantum dots may be adjusted according to a size of each of the quantum dots or a molar ratio of a molecular cluster compound and a nano particle precursor in a synthesis process. The organic ligand may be formed of at least one of pyridine, mercapto alcohol, thiol, phosphine, and phosphine oxide. The organic ligand may stabilize the unstable quantum dots after the synthesis process is performed. After the synthesis process is performed, a dangling bond is formed outside the quantum dots. Thus, the quantum dots may be instable due to the dangling bond. However, one end of the organic ligand may be in a non-bonded state, and the non-bonded one end of the organic ligand may be bonded to the dangling bond to stabilize the quantum dots.

Specifically, when the quantum dot has a radius less than a Bohr radius of an exciton constituted by an electron and hole, which are excited by light and electricity, a quantum confinement effect may occur. Thus, the quantum dot has a discrete energy level to change an intensity of an energy gap. In addition, a charge may be limited within the quantum dot to provide high light emitting efficiency.

The quantum dot may be changed in emission wavelength according to a particle size thereof, unlike a general fluorescent dye. That is, when the particle size is gradually decreased, the quantum dot may emit light having a short wavelength. Thus, the particle size may be adjusted to emit visible light having a desired wavelength. Also, since the quantum dot has an extinction coefficient greater by about 100 times to about 1,000 times than that of the general fluorescent dye and quantum yield greater than that of the general fluorescent dye, the quantum dot may emit very intense light.

The quantum dot may be synthesized by a chemical wet etching process. Here, the chemical wet etching process is a process in which a precursor material is immersed into an organic solvent to grow particles. Thus, the quantum dot may be synthesized through the chemical wet etching process.

The host 440 surrounds the light conversion particles 430. That is, the light conversion particles 430 are uniformly dispersed into the host 440. The host 440 may be formed of a polymer. The host 440 is transparent. That is, the host 440 may be formed of a transparent polymer.

The host 440 is disposed inside the tube 410. That is, the host 440 is filled into the tube 410 as a whole. The host 440 may be closely attached to an inner surface of the tube 410.

An air layer 450 may be disposed between the sealing member 420 and the host 440. The air layer 450 is filled with nitrogen. The air layer 450 may serve as a buffer layer between the sealing member 420 and the host 440.

As shown in FIGS. 2 and 3, the first adhesion member 510 is disposed between the light guide plate 200 and the light conversion member 400. The first adhesion member 510 is closely attached to the light guide plate 200 and the light conversion member 400. In detail, the first adhesion member 510 is closely attached to the light incident surface of the light guide plate 200 and closely attached to an outer surface of the tube 410.

That is, the first adhesion member 510 may be attached or adhere to the light incident surface of the light guide plate 200 so that the air layer is not disposed between the first adhesion member 510 and the light incident surface of the light guide plate 200. Similarly, the first adhesion member 510 may be attached or adhere to the outer surface of the tube 410 so that the air layer is not disposed between the first adhesion member 510 and the outer surface of the tube 410. That is, the first adhesion member 510 may be a gap filler filling a gap between the light conversion member 400 and the light guide plate 200.

The first adhesion member 510 is transparent. The first adhesion member 510 may be formed of a transparent resin. Also, the first adhesion member 510 may be formed of a thermosetting resin or a thermoplastic resin. Also, the first adhesion member 510 may be formed of an epoxy-based resin.

The first adhesion member 510 may have a reflective index within about ±0.1 with respect to that of the light guide plate 200. That is, the first adhesion member 510 may have a reflective index satisfying the following Equation 1.

$$n3-0.1<n1<n3+0.1 \quad \text{[Equation 1]}$$

Where, n1 denotes a reflective index of the first adhesion member 510, and n3 denotes a reflective index of the light guide plate 200.

For example, the first adhesion member 510 may have a reflective index of about 1.47 to about 1.67.

The first adhesion member 510 may serve as an optical buffer function between the light conversion member 400 and the light guide plate 200. That is, the first adhesion member 510 may prevent the air layer from being disposed between the light conversion member 400 and the light guide plate 200 and have a reflective index similar to those of the tube 410 and the light guide plate 200. As a result, the first adhesion member 510 may reduce a significant change of the reflective index between the light conversion member 400 and the light guide plate 200.

As shown in FIGS. 2 and 3, the second adhesion member 520 is disposed between the LED 300 and the light conversion member 400. The second adhesion member 520 is closely attached to the LED 300 and the light conversion member 400. In detail, the second adhesion member 520 is closely attached to the light emission surface of the LED 300 and closely attached to an outer surface of the tube 410.

That is, the second adhesion member 520 may be attached or adhere to the light emission surface of the LED 300 so that the air layer is not disposed between the second adhesion member 520 and the light emission surface of the LED 300. Similarly, the second adhesion member 520 may be attached or adhere to the outer surface of the tube 410 so that the air layer is not disposed between the second member 520 and the outer surface of the tube 410. That is, the second adhesion member 520 may be a gap filler filling a gap between the LED 300 and the light conversion member 400.

The second adhesion member 520 is transparent. The second adhesion member 520 may be formed of a transparent resin. Also, the second adhesion member 520 may be formed of a thermosetting resin or a photocurable resin. Also, the second adhesion member 520 may be formed of an epoxy-based resin.

The second adhesion member 520 may have a reflective index within about ±0.1 with respect to that of the filler 340 of the LED 300. That is, the second adhesion member 510 may have a reflective index satisfying the following Equation 2.

$$n4-0.1 < n2 < n4+0.1$$ [Equation 2]

Where, n2 denotes a reflective index of the second adhesion member 520, and n4 denotes a reflective index of the filler 340.

For example, the second adhesion member 520 may have a reflective index of about 1.44 to about 1.64.

The second adhesion member 520 may serve as an optical buffer function between the light conversion member 400 and the LED 300. That is, the second adhesion member 520 may prevent the air layer from being disposed between the light conversion member 400 and the LED 300 and have a reflective index similar to those of the tube 410 and the filler 340. As a result, the second adhesion member 520 may reduce a significant change of the reflective index between the light conversion member 400 and the filler 340.

Also, the first and second adhesion members 510 and 520 may be formed of the same material as each other.

The light path change particles 600 are disposed between the light guide plate 200 and the light conversion member 400. In detail, the light path change particles 600 are disposed within the first adhesion member 510. In more detail, the light path change particles 600 are inserted into the first adhesion member 510. The light path change particles 600 may be dispersed into the first adhesion member 510 at about 10 wt % to about 50 wt %.

The light path change particles 600 may selectively reflect incident light. In detail, the light path change particles 600 have reflectance different from each other according to a wavelength of the incident light.

As described above, the LED 300 emits first light, and the light conversion member 400 transmits a portion of the first light. The other portion of the first light may be converted into light having a different wavelength.

That is, the other portion of the first light may be converted into second light by a portion of the light conversion particles 430 and converted into third light by the other portion of the light conversion particles 430.

Here, the first light may be blue light, the second light may be green light, and the third light may be red light.

Thus, the first light, the second light, and the third light, which transmit the light conversion member 400 without being converted, are emitted through the light conversion member 400.

Here, the light path change particles 600 may selectively reflect the first light and selectively change a path of the first light. That is, the light path change particles 600 may selectively increase an orientation angle of the transmitted first light. In detail, the light path change particles 600 may selectively change a path of light having a wavelength band of about 400 nm to about 500 nm.

As a result, the light path change particles 600 may selectively increase a divergence angle of the first light. That is, the light path change particles 600 may selectively further increase the orientation angle of the first light of the first, second, and third light.

Referring to FIGS. 6 to 8, each of the light path change particles 600 includes a bead 610 and a reflection part 620.

The bead 610 may have a globular shape or a ball shape. The bead 610 may be transparent. The bead may be formed of glass or plastic.

The bead 610 may have a diameter of about 10 μm to about 500 μm. The bead 610 may have a reflective index of about 1.45 to about 1.65. The bead 610 and the first adhesion member 510 may have the substantially same reflective index as each other.

The reflection part 620 is disposed on a surface of the bead 610. In detail, the reflection part 620 may be coated on an outer surface of the bead 610. The reflection part 620 may be coated on an area ranging from about 10% to about 50% of the entire surface of the bead 610. On the other hand, the reflection part 620 may be coated on the entire outer surface of the bead 610.

The reflection part 620 may selectively reflect incident light. For example, the reflection part 620 may have a relatively high reflectance with respect to blue light. In detail, the reflection part 620 may have a first reflectance with respect to light having a wavelength of about 400 nm to about 470 nm. Also, the reflection part 620 may have a second reflectance greater than the first reflectance with respect to light having a wavelength of about 480 nm to about 700 nm.

For example, the first reflectance may be about 70% to about 100%, and the second reflectance may be about 0% to about 30%.

Referring to FIGS. 7 and 8, the reflection part 620 may include a plurality of reflective layers 621, 622 and 623, The reflective layers 621, 622 and 623 may be optically designed so that the reflective layers 621, 622 and 623 adjacent to each other have reflective indexes different from each other. For example, a reflective index between the reflective layers 621, 622 and 623 adjacent to each other may be about 0.1 to about 1.5.

Each of the reflective layers 621, 622 and 623 may be formed of $MgF_2$, $SiO_2$, $TiO_2$ or $ZrO_3$. The number of reflective layers 621, 622 and 623 may vary from 1 to 10.

The reflective layers 621, 622 and 623 may be designed to cause constructive interference with respect to light having a predetermined wavelength. For example, the reflective layers 621, 622 and 623 may be designed to cause constructive interference with respect to light having a wavelength of about 400 nm to about 500 nm. For example, the reflection part 620 may include a first reflective layer 621, a second reflective layer 622 and a third reflective layer 623.

The first reflective layer 621 is directly coated on the surface of the bead 610. The first reflective layer 621 may have a thickness satisfying the following Equation 3.

$$n11 \times d1 = \lambda/8 \qquad \text{[Equation 3]}$$

n11 is the index of refraction of the first reflective layer 621, d1 is the thickness of the first reflective layer 621 and λ is from 400 nm to 470 nm.

In this case, constructive interference between light reflected by an interface between the first reflective layer 621 and the bead 610 and light reflected by an interface between the first reflective layer 621 and the second reflective layer 622 may occur.

The second reflective layer 622 is directly coated on a surface of the first reflective layer 621. The second reflective layer 622 may have a thickness satisfying the following Equation 4.

$$n22 \times d2 = \lambda/4 \qquad \text{[Equation 4]}$$

n22 is the index of refraction of the second reflective layer 622, d2 is the thickness of the second reflective layer 622 and λ is from 400 nm to 470 nm.

In this case, constructive interference between light reflected by an interface between the first reflective layer 621 and the second reflective layer 622 and light reflected by an interface between the second reflective layer 622 and the third reflective layer 623 may occur.

The third reflective layer 623 is directly coated on a surface of the second reflective layer 622. The third reflective layer 623 may have a thickness satisfying the following Equation 5.

$$n33 \times d3 = \lambda/8 \qquad \text{[Equation 5]}$$

n33 is the index of refraction of the third reflective layer 623, d3 is the thickness of the third reflective layer 623 and λ is from 400 nm to 470 nm.

In this case, constructive interference between light reflected by an interface between the second reflective layer 622 and the third reflective layer 623 and light reflected by an outer surface may occur.

That is, the first, second, and third reflective layers 621, 622 and 623 may be optically designed to selectively reflect light having a desired wavelength through the methods shown in Equations 3, 4 and 5.

That is, the thicknesses of the first, second and third reflective layers 621, 622 and 623 may be determined by a reflective index of each of the reflective layers and a wavelength to be selectively reflected.

Therefore, since a material used for each of the reflective layers 621, 622 and 623, and a deposited thickness may be adjusted, the reflection part 620 may selectively reflect light having a predetermined wavelength band.

Also, the reflective layers 621, 622 and 623 may be manufactured through a vacuum deposition process. That is, a material such as $MgF_2$, $SiO_2$, $TiO_2$ or $ZrO_3$ may be alternately deposited inside a chamber in which the bead 610 is disposed to manufacture the reflective layers 621, 622 and 623. As a result, the reflective part 620 may be disposed on a portion of the surface of the bead 610.

On the other hand, the reflective layers 621, 622 and 623 may be manufactured through a wet process such as a chemical bath deposition (CBD) process. In this case, the reflection part 620 may be disposed on the entire surface of the bead 610.

Also, the light path change particles 600 may be dispersed in a random direction within the first adhesion member 510. That is, the light path change particles 620 may be disposed so that the reflection part 620 is disposed in a random direction.

The optical sheets 700 are disposed on the light guide plate 200. The optical sheets 700 improve characteristics of light transmitting therethrough.

The FPCB 800 is electrically connected to the LED 300. The LED 300 may be mounted on the FPCB 800. The FPCB 800 may be a flexible printed circuit board and disposed within the mold frame 10. The FPCB 800 is disposed on the light guide plate 200.

A backlight unit is constituted by the mold frame 10 and the backlight assembly 20. That is, the backlight unit includes the mold frame 10 and the backlight assembly 20.

The liquid crystal panel 30 is disposed inside the mold frame 10 and on the optical sheets 700.

The liquid crystal panel 30 adjusts an intensity of light transmitting therethrough to display an image. That is, the liquid crystal panel 30 is a display panel for display an image. The liquid crystal panel 30 includes a TFT substrate, a color filter substrate, a liquid crystal layer disposed between the two substrates, and polarizing filters.

Referring to FIG. 9, the liquid crystal display according to an embodiment may display an image through the following processes.

First light is emitted from the LED 300. Here, blue light may be emitted from the LED 300.

The emitted first light passes through the second adhesion member 520. Here, since the air layer between the LED 300 and the light conversion member 400 is removed by the second adhesion member 520, light losses (e.g., Fresnel losses) due to a significant reflective index difference may be prevented. Thus, the brightness of the light crystal display according to an embodiment may be improved by the second adhesion member 520.

A portion of the first light passing through the second adhesion member 520 passes through the light conversion member 400, the other portion of the first light is converted into second and third light by the light conversion particles 430. That is, a portion of the first light passes through the light conversion member 400, and the second and third light are emitted from the light conversion member 400. Here, the first light may be blue light, the second light may be green light, and the third light may be red light.

The transmitted first, second, and third light pass through the first adhesion member 510. Similarly, since the air layer between the light guide plate 200 and the light conversion member 400 is removed by the first adhesion member 510, light losses due to a significant reflective index difference may be prevented. Thus, the brightness of the light crystal display according to an embodiment may be improved by the first adhesion member 510.

Here, the transmitted first light may have a divergence angle less than those of the second and third light. That is, when the first light is emitted from the LED 300, the first light has an orientation angle less than those of the second and third light.

When the first light is converted into the second and third light by the light conversion particles 430, the second and third light are randomly emitted in all directions. Thus, the second and third light may have relatively large divergence angels, respectively.

Here, as described above, the light path change particles 600 may selectively change a path of the first light. That is, the light path change particles 600 may change a path of light having a relatively small divergence angle, i.e., a wavelength of about 400 nm to about 470 nm.

That is, the light path change particles 600 may increase the divergence angle of the first light without changing paths of the second and third light. Thus, the first light may be incident into the light guide plate 200 at a large divergence angle.

That is, the first, second, and third light may be incident into the light guide plate 200 at the same orientation angle as each other. Thus, the first, second, and third light may be uniformly mixed with each other and incident into the light guide plate 200.

Thus, the liquid crystal display according to an embodiment may have improved color reproductivity.

Also, since the light path change particles 600 do not change the paths of the second and third light, the losses of the second and third light may be reduced.

Thus, the liquid crystal display according to an embodiment may be improved brightness.

Figure 10:
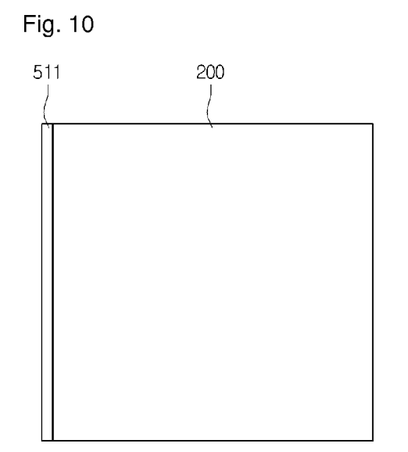
FIGS. 10 to 12 are views illustrating a process of manufacturing the liquid crystal display according to the first embodiment.
Figure 11:
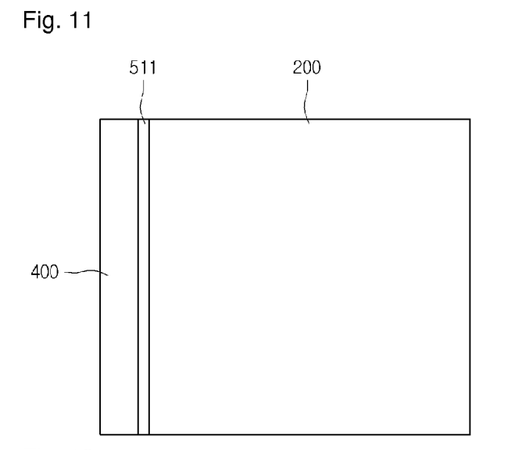
Figure 12:
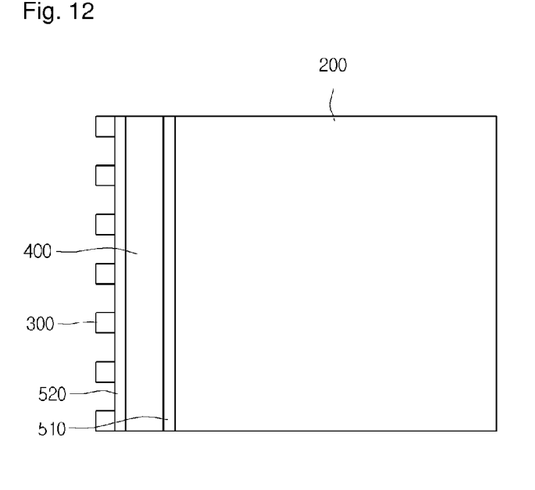

FIGS. 10 to 12 are views illustrating a process of manufacturing the liquid crystal display according to the first embodiment. Description of a manufacturing process according to the current embodiment will be described with reference to the description of the above-described liquid crystal display. That is, the description with respect to the above-described liquid crystal display may be fundamentally coupled to the description of the manufacturing process according to the current embodiment.

Referring to FIG. 10, a plurality of reflective layers 621, 622 and 623, are coated on a surface of a plurality of beads 610 to form a plurality of light path change particles 600. The light path change particles 600 may be uniformly mixed into a photocurable or thermosetting first resin compound.

Thereafter, the first resin compound 511 in which the light path change particles 600 are dispersed is coated on a side of a light guide plate 200.

Referring to FIG. 11, a light conversion member 400 is attached to the first resin compound 511.

Referring to FIG. 12, a second resin compound in which the light path change particles 600 are not dispersed is coated on the light conversion member 400, and an LED 300 is attached to the second resin compound.

Thereafter, the first resin compound 511 attached to the light guide plate 200 and the second resin compound attached to the light conversion member 400 are cured by heat and/or light to form a first adhesion member 510 and a second adhesion member 520.

Also, through the above-described processes, the LED 300, the light conversion member 400, and the light guide plate 200 adhere to each other. Also, air layers among the LED 300, the light conversion member 400, and the light guide plate 200 may be removed.

Each of the first and second resin compounds may be formed of an epoxy-based resin.

Through the above-described processes, a liquid crystal display having more improved brightness and color reproductivity.

Figure 13:
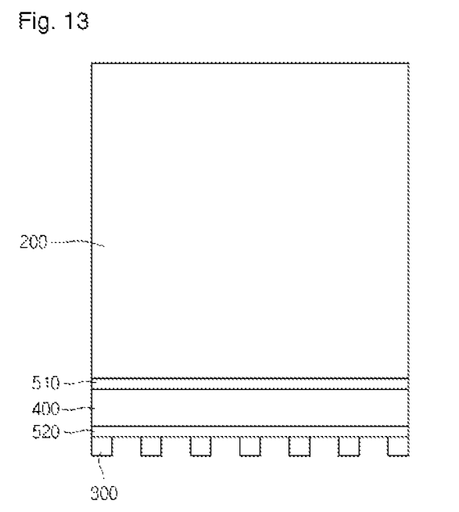
FIGS. 13 to 15 are views of backlight assemblies according to second to fourth embodiments.
Figure 14:
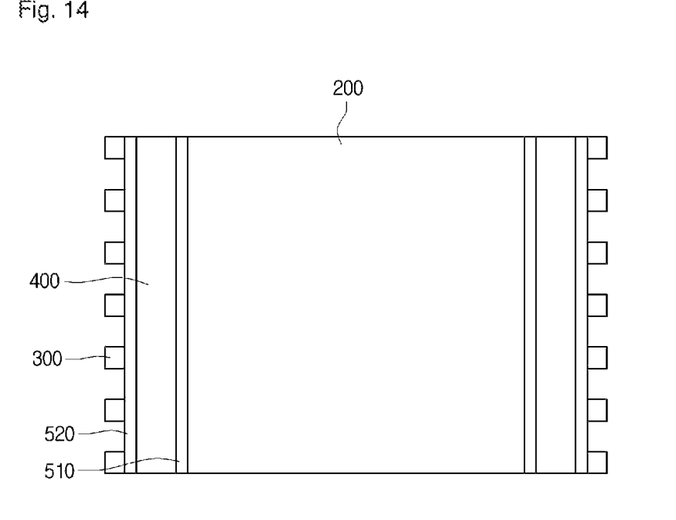
Figure 15:
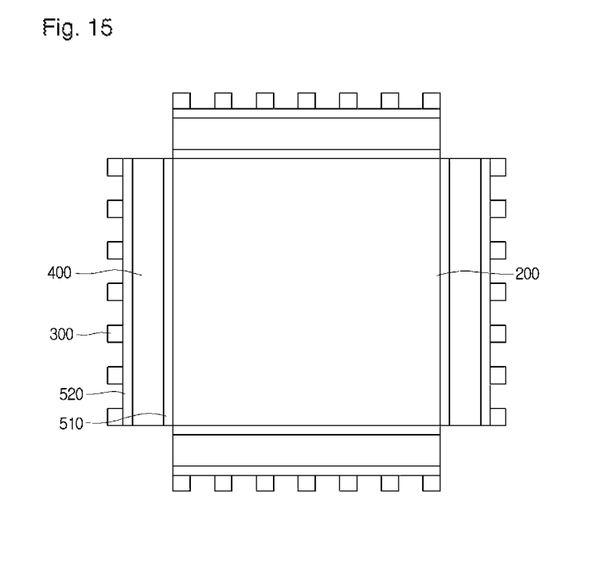

FIGS. 13 to 15 are views of backlight assemblies according to second to fourth embodiments. Description of the current embodiment will be described with reference to the description of the foregoing embodiment. That is, the description with respect to the foregoing embodiment may be fundamentally coupled to the description of the current embodiment.

Referring to FIG. 13, a first adhesion member 510 in which light path change particles 600 are dispersed is disposed on one side surface of a light guide plate 200. Thus, one light conversion member 400 may be attached to the first adhesion member 510. Also, a second adhesion member 520 may be attached to the light conversion member 400, and an LED 300 may be attached to the light conversion member 400 through the second adhesion member 520.

For example, a structure of the backlight assembly 20 of FIG. 7 may be applied to a liquid crystal display on which a portable terminal for mobile.

Also, the first adhesion member 510, the light conversion member 400, the second adhesion member 520, and the light conversion member 400 may be disposed on side surfaces of the light guide plate 200, respectively.

That is, as shown in FIG. 14, light emitting complex structures including the first adhesion member 510 in which the light path change particles 600 are dispersed, the light conversion member 400, the second adhesion member 520, and the LED 300 are disposed on both side surfaces of the light guide plate 200, respectively.

Also, as shown in FIG. 15, light emitting complex structures including the first adhesion member 510 in which the light path change particles 600 are dispersed, the light conversion member 400, the second adhesion member 520, and the LED 300 are disposed on fourth side surfaces of the light guide plate 200, respectively.

Figure 16:
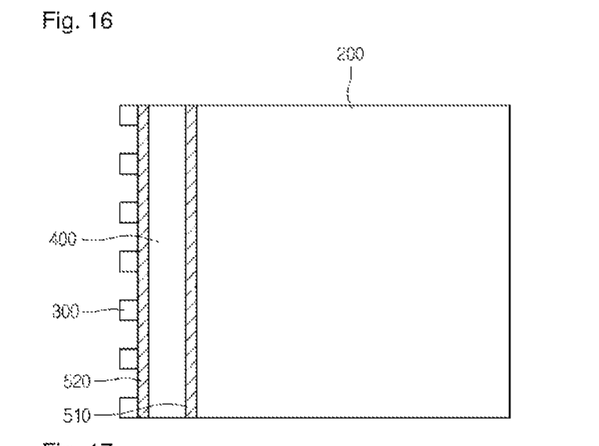
FIG. 16 is a view of a backlight assembly according to a fifth embodiment.
Figure 17:
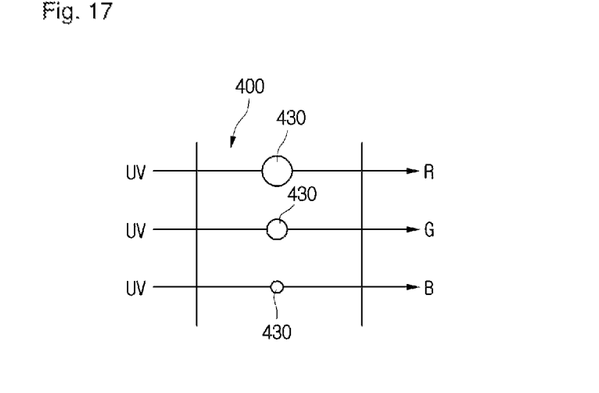
FIG. 17 a view illustrating a process of converting ultraviolet rays using a light conversion member according to the fifth embodiment.

FIG. 16 is a view of a backlight assembly according to a fifth embodiment. FIG. 17 a view illustrating a process of converting ultraviolet rays using a light conversion member according to the fifth embodiment. Description of the current embodiment will be described with reference to the description of the foregoing embodiment. That is, the description with respect to the foregoing embodiment may be fundamentally coupled to the description of the current embodiment.

Referring to FIGS. 16 and 17, an LED 300 may generate an UV ray. The LED 300 may generate light having a wavelength of about 300 nm to about 400 nm.

A light conversion member 400 converts the UV ray emitted from the LED 300 into first, second, and third light. For example, the first light may be blue light, the second light may be green light, and the third light may be red light.

That is, the light conversion member 400 may include a plurality of first light conversion particles 430, a plurality of second conversion particles 430, and a plurality of third light conversion particles 430. Here, the first light conversion particles 430 may convert the UV ray into the blue light. The second light conversion particles 430 may convert the UV ray into the green light. The third light conversion particles 430 may convert the UV ray into the red light.

Thus, the light conversion member 400 converts the UV ray emitted from the LED 300 into the blue, green, and red light, and then, the converted blue, green, red light are incident into a light guide plate 200. Here, the blue light, the green light, and the red light are mixed with each other. Therefore, white light may be incident into the light guide plate 200.

Any reference in this specification to "one embodiment", "an embodiment", "example embodiment", etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

INDUSTRIAL APPLICABILITY

The liquid crystal display according to the embodiments may be used in display fields.

The invention claimed is:

1. A display device comprising:
a light guide plate;
a light source disposed on a side surface of the light guide plate;
a light conversion member disposed between the light source and the light guide plate; and
a plurality of light path change particles disposed between the light conversion member and the light guide plate.

2. The display device of claim 1, wherein each of the light path change particles is formed of glass or polymer.

3. The display device of claim 1, further comprising an adhesion member closely attached to the light conversion member and the light guide plate,
wherein the light path change particles are inserted into the adhesion member.

4. The display device of claim 1, wherein each of the light path change particles comprises:
a transparent bead; and
a reflection part disposed on a surface of the bead.

5. The display device of claim 4, wherein the reflection part is formed of $MgF_2$, $SiO_2$, $TiO_2$ or $ZrO_3$.

6. The display device of claim 4, wherein the reflection part has a first reflectance with respect to light having a wavelength of about 400 nm to about 500 nm and a second reflectance with respect to light having a wavelength of about 500 nm to about 700 nm,
wherein the first reflectance is greater than the second reflectance.

7. The display device of claim 6, wherein the light source generates the first light having the wavelength of about 400 nm to about 500 nm, and the light conversion member converts the first light into the light having the wavelength of about 500 nm to about 700 nm.

8. The display device of claim 6, wherein the reflection part comprises a plurality of reflective layers, and
the reflective layers adjacent to each other have reflective indexes different from each other.

9. A display device comprising
a light source generating first light;
a light conversion member through which a portion of the first light is transmitted and the other portion of the first light is converted into second and third light; and
a plurality of light path change particles for selectively reflecting the first light.

10. The display device of claim 9, wherein the first light has a wavelength of about 400 nm to about 500 nm, the second light has a wavelength of about 500 nm to about 600 nm, and the third light has a wavelength of about 600 nm to about 700 nm.

11. The display device of claim 9, wherein each of the light path change particles comprises:
a bead; and
a reflection part coated on a surface of the bead to selectively reflect the first light.

12. The display device of claim 11, wherein the reflection part has a reflectance of about 70% to about 100% with respect to the first light and a reflectance of about 0% to about 30% with respect to the second light or the third light.

13. The display device of claim 11, wherein the reflective part is coated on an area ranging from about 10% to about 50% of the entire outer surface of the bead.

14. A display device comprising:
a light guide plate;
a light source disposed on a side surface of the light guide plate;
a light conversion member disposed between the light source and the light guide plate;
an adhesion member adhering to the light guide plate and the light conversion member; and
a plurality of light path change particles dispersed into the adhesion member,
wherein each of the light path change particles comprises a reflection part selectively reflecting light having a wavelength band of about 400 nm to about 500 nm.

15. The display device of claim 14, wherein the reflection part comprises a plurality of reflective layers, and
the reflective layers adjacent to each other of the plurality of reflective layers have reflective indexes different from each other.

16. The display device of claim 15, wherein each of the reflective layers satisfies following Equation:

$$n \times d = \lambda/8,$$

wherein n is the index of refraction of the reflective layer, d is the thickness of the reflective layer and λ is from 400 nm to 470 nm.

17. The display device of claim 15, wherein each of the reflective layers satisfies following Equation:

$$n \times d = \lambda/4,$$

wherein n is the index of refraction of the reflective layer, d is the thickness of the reflective layer and λ is from 400 nm to 470 nm.

18. The display device of claim 14, wherein the light path change particles are dispersed into the adhesion member about 10 wt % to about 50 wt %.

* * * * *